UNITED STATES PATENT OFFICE.

AUGUST PAUL HORN, OF HAMBURG, GERMANY.

SHIP'S PAINT.

No. 898,476.  Specification of Letters Patent.  Patented Sept. 15, 1908.

Application filed December 26, 1907. Serial No. 408,189.

*To all whom it may concern:*

Be it known that I, AUGUST PAUL HORN, subject of Germany, residing at Hamburg, Germany, have invented new and useful Improvements in Ships' Paints, of which the following is a specification.

Hitherto ships-paints have had as a basis well known inert lacquers or colors to which substances, active against animal and vegetable life, such as quicksilver, copper combinations, tobacco extract and the like, were added. The action of these lacquers or colors when applied to ships bottoms is however very restricted and as all binding agents hitherto used are more or less soluble in sea water, it is not very long before the whole of the active poisonous substances are freed and washed off. According to the present invention this drawback is avoided by adding to the paint a basis which offers great resistance to the action of sea water and combines the properties of a binding agent and of a poison. Such substances are found in the products of condensation of phenols with aldehydes. A ships' paint produced with the aid of these products when applied to the hull of a ship soon kills the living organisms which have become attached thereto. In my opinion this action of this improved paint is based on the fact that through the action of the living organisms a gradual splitting up of the products of condensation into their components phenol and formaldehyde is effected.

The resin of phenol-aldehyde can be produced in any known manner, for instance two parts phenol are heated in a steam bath together with two parts of 40% formaldehyde and one part of concentrated hydrochloric acid. The product so produced is perfectly insoluble in water, and only slowly soluble in turpentine oil, and very slowly soluble in alcohol. The paint produced from the said products of condensation can also be advantageously used in covering paints for the walls of rooms and the like as protection against vermin, fungus and the like.

Having now particularly described and ascertained the nature of the said invention and in what manner the same is to be performed, I declare that what I claim is:

Ships' paints containing products of condensation of phenols and aldehydes.

In testimony whereof I have signed my name to this specification in the presence of two subscribing witnesses.

AUGUST PAUL HORN.

Witnesses:
ERNEST H. L. MUMMENHOFF.
ALFRED JOSEPH.